(12) United States Patent
Lacy

(10) Patent No.: US 6,379,826 B1
(45) Date of Patent: Apr. 30, 2002

(54) REGULATING A FUEL CELL POWERED HEATING SYSTEM

(75) Inventor: Robert A. Lacy, Scotia, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/442,526

(22) Filed: Nov. 18, 1999

(51) Int. Cl.[7] .............................................. H01M 8/00
(52) U.S. Cl. .......................... 429/13; 429/12; 429/24; 429/20; 429/21; 429/22; 429/26; 429/61; 429/62; 429/92
(58) Field of Search .............................. 429/12, 13, 24, 429/20, 21, 22, 26, 92, 61, 62

(56) References Cited

U.S. PATENT DOCUMENTS

| 4,198,597 A | 4/1980 | Sawyer |
| 4,670,702 A | 6/1987 | Yamada et al. |
| 4,741,978 A | 5/1988 | Takabayashi |
| 4,839,246 A | 6/1989 | Takabayashi |
| 4,839,574 A | 6/1989 | Takabayashi |
| 4,883,724 A | 11/1989 | Yamamoto |
| 4,904,548 A | 2/1990 | Tajima |
| 4,988,283 A | 1/1991 | Nagasawa et al. |
| 5,010,470 A | 4/1991 | Lipman et al. |
| 5,198,970 A | 3/1993 | Kawabata et al. |
| 5,290,641 A | 3/1994 | Harashima |
| 5,334,463 A | 8/1994 | Tajima et al. |
| 5,366,821 A | 11/1994 | Merritt et al. |
| 5,624,768 A | 4/1997 | Tanokura |
| 5,714,874 A | 2/1998 | Bonnefoy |
| 5,858,568 A | * 1/1999 | Hsu et al. ..................... 429/13 |

* cited by examiner

Primary Examiner—Carol Chaney
Assistant Examiner—Angela J. Martin
(74) Attorney, Agent, or Firm—Trop, Pruner & Hu, P.C.

(57) ABSTRACT

A fuel cell system includes a fuel cell stack, an inverter, a reformer and a circuit. The fuel cell stack is adapted to produce heat in response to a fuel flow, and the inverter is coupled to the fuel cell stack and is adapted to use electrical energy produced by the fuel cell stack to furnish electrical power that is received by a power grid. The reformer is adapted to produce the fuel flow, and the circuit is adapted to interact with the reformer to produce an approximate predetermined amount of heat. The circuit also determines cell voltages of the fuel cell stack, selects the minimum cell voltage, and interacts with the inverter to regulate the amount of the electrical power that is furnished by the inverter based on the selected voltage.

21 Claims, 3 Drawing Sheets

REGULATING A FUEL CELL POWERED HEATING SYSTEM

BACKGROUND

The invention relates to regulating a fuel cell powered heating system.

A fuel cell is an electrochemical device that converts chemical energy produced by a reaction directly into thermal energy and electrical energy. For example, one type of fuel cell includes a proton exchange membrane (PEM), a membrane that may permit only protons to pass between an anode and a cathode of the fuel cell. At the anode, diatomic hydrogen (a fuel) is oxidized to produce hydrogen protons that pass through the PEM. The electrons produced by this oxidation travel through circuitry that is external to the fuel cell to form an electrical current. At the cathode, oxygen is reduced and reacts with the hydrogen protons to form water. The anodic and cathodic reactions are described by the following equations:

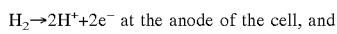

$H_2 \rightarrow 2H^+ + 2e^-$ at the anode of the cell, and

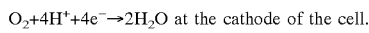

$O_2 + 4H^+ + 4e^- \rightarrow 2H_2O$ at the cathode of the cell.

Besides electricity, the fuel cell also produces heat. Therefore, the fuel cell may be used to supply heat for purposes of regulating the temperature of a fluid, such as air or water, for example. By itself, a fuel cell provides relatively little heat. Therefore, for purposes of generating more heat, several fuel cells may be formed out of an arrangement called a fuel cell stack, an arrangement in which the fuel cells are electrically coupled together in series. Due to this electrical configuration, the power production capability of the fuel cell stack is also enhanced.

The fuel cell stack may include plates (graphite composite or metal plates, as examples) that are stacked one on top of the other, and each plate may be associated with more than one fuel cell of the stack. The plates may be made from a graphite composite material and include various channels and orifices to, as examples, route the reactants and products through the fuel cell stack. Several PEMs (each one being associated with a particular fuel cell) may be dispersed throughout the stack between the anodes and cathodes of the different fuel cells.

When used to produce heat, the fuel cell stack is capable of generating a large amount of power that may be transferred to an electrical utility's power grid, for example. However, if not properly regulated, the transfer of power to the power grid may adversely affect the efficiency and health of the fuel cell stack.

SUMMARY

In an embodiment of the invention, a method includes regulating a fuel cell system to produce a predetermined amount of heat. The fuel cell system also produces electrical energy that is transferred from the fuel cell system to a power grid. The minimum cell voltage of the fuel cell system is selected, and the rate at which the electrical energy is transferred to the power grid is regulated based on the minimum cell voltage. In some embodiments, the cell voltages are continually monitored during the regulation to dynamically determine the minimum cell voltage.

Advantages and other features of the invention will become apparent from the following description, from the drawing and from the claims.

DETAILED DESCRIPTION

Figure 1:
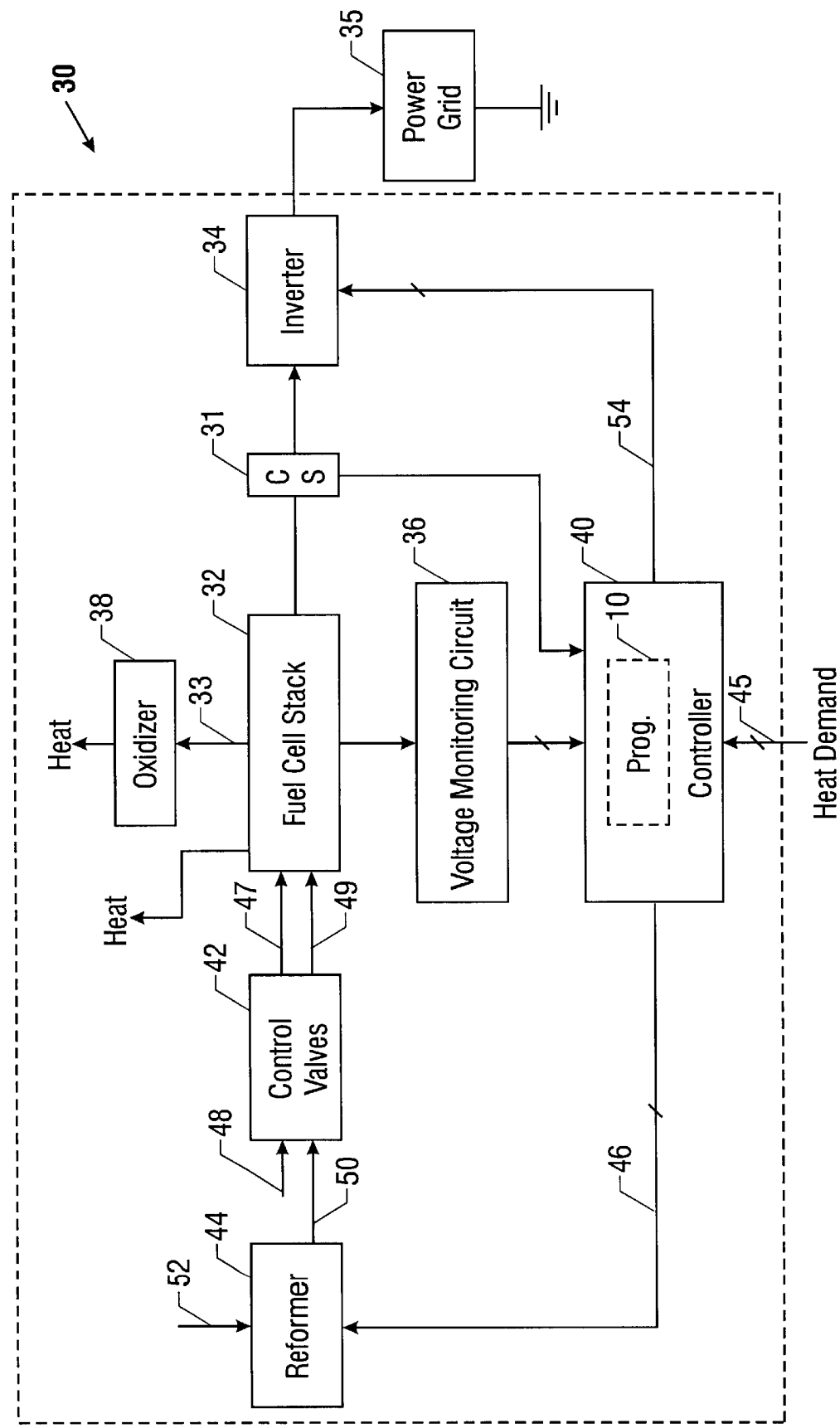
FIG. 1 is a schematic diagram of a fuel cell system according to an embodiment of the invention.

Referring to FIG. 1, an embodiment 30 of a fuel cell system in accordance with the invention includes a fuel cell stack 32 that consumes reactants (hydrogen and air, as examples) in chemical reactions that produce heat. As an example, this heat may be supplied to a fluid (air or water, for example) for purposes of keeping the temperature of the fluid within a specified range. A byproduct of the chemical reactions is electrical energy, an energy that may be transferred to an electrical utility's power grid 35, for example. To regulate this transfer, a controller 40 (of the fuel cell system 30) controls the rate at which the electrical energy is supplied to the power grid 35 (otherwise called the power output of the fuel cell system 30) based on the cell voltages of fuel cells of the stack 32.

The controller 40 regulates the power output of the stack 32 in a manner that maintains the minimum cell voltage of the stack 32 within a specified range of voltages. Due to this regulation, the power output and thermal efficiency of the stack 32 may be optimized, as described below.

More particularly, the cell voltages decrease with an increase in the power output, and the cell voltages increase with a decrease in the power output. However, the efficiency and general safety of the stack 32 may suffer if one of the cell voltages goes too low. Thus, in general, the power output and the thermal efficiency of the stack 32 are optimized with low cell voltages. Therefore, the controller 40 attempts to minimize the cell voltages while ensuring that none of the cell voltages drops below a minimum cell voltage threshold. To accomplish this, the controller 40 regulates the power output based on the minimum cell as, voltage, a voltage that may be obtained from a voltage monitoring circuit 36 of the fuel system 30.

Figure 2:
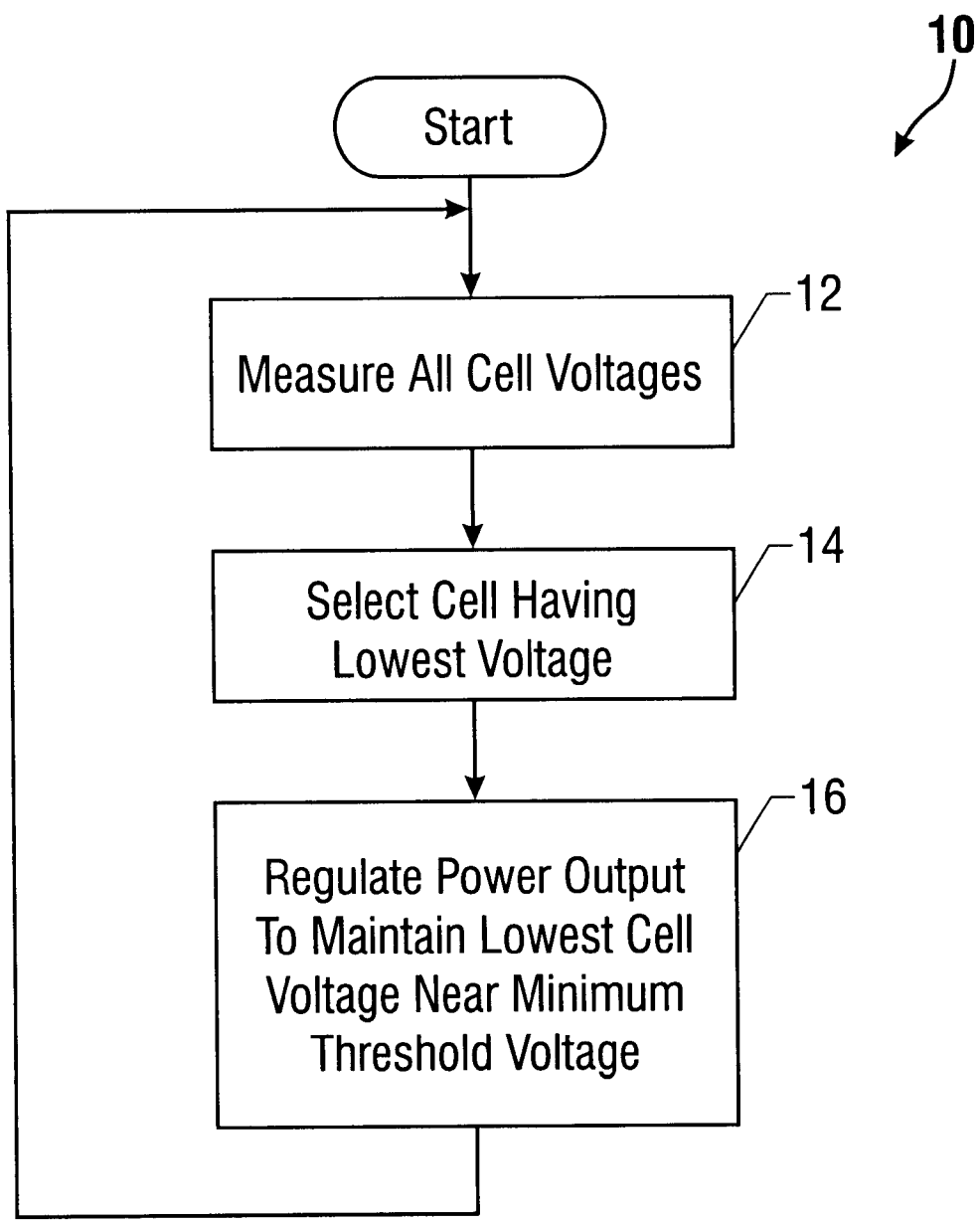
FIG. 2 is a flow diagram illustrating a technique to regulate power transfer between the fuel cell system of FIG. 1 and a power grid according to an embodiment of the invention.

The voltage monitoring circuit 36 is coupled to the fuel cell stack 32 to continually measure the cell voltages and to also provide indications of the measured cell voltages to the controller 40. Either the voltage monitoring circuit 36 or the controller 40 (depending on the particular embodiment) may determine the lowest cell voltage, a voltage that the controller 40 uses to regulate the power output of the fuel cell system 30. Referring also to FIG. 2, in this manner, the controller 40 uses the voltage monitoring circuit 36 (see FIG. 1) to measure (block 12 of FIG. 2) all of the cell voltages of the fuel cell stack 32. From this information, the controller 40 selects (block 14) the cell that has the lowest voltage and regulates (block 16) the power output of the fuel cell system 30 to maintain the lowest cell voltage near the minimum threshold voltage. In some embodiments, the controller 40 may periodically retrieve indications of the measured voltages and/or an indication of the lowest cell voltage from the voltage monitoring circuit 36.

In some embodiments, the controller 40 regulates the lowest cell voltage to keep this voltage within an error band of voltages about a setpoint voltage, a voltage near the minimum threshold voltage. In the course of this regulation, when the lowest cell voltage becomes high enough to rise above the error band, the controller 40 increases the power output to lower the lowest cell voltage. Conversely, when the lowest cell voltage becomes low enough to drop below the error band, the controller 40 decreases the power output to raise the lowest cell voltage. In some embodiments, the controller 40 may use a proportional-integral-derivative (PID) control scheme to adjust the power output to regulate the minimum cell voltage within an error band about a setpoint voltage.

The cell voltages may vary over the lifetime and/or operating conditions of the fuel cell stack 32. Thus, over time, different cells may furnish the minimum cell voltage. However, because the controller 40 bases its control on the most recently determined minimum voltage cell, the control by the controller 40 accounts for this occurrence. Thus, in some embodiments, the controller 40 dynamically determines the minimum cell voltage during the course of regulation.

Referring back to FIG. 1, the controller 40 regulates the heat that is generated by the fuel cell stack 32 in response to a heat demand signal, a signal that may be either an analog or a digital signal and is received on one or more input lines 45 of the controller 40. In some embodiments, the heat demand signal indicates whether the current heat output of the fuel cell system 30 needs to be increased or decreased. For example, the heat demand signal may be generated by circuitry that receives an indication of the temperature of the fluid (air or water, as examples) being regulated and compares this temperature with a range of desired temperatures for the fluid. Based on this comparison, the circuitry generates the heat demand signal.

If the heat that is produced by the fuel cell stack 32 needs to be increased (as indicated by the heat demand signal), then the controller 40 increases the flow of hydrogen to the fuel cell stack 32. To accomplish this, the controller 40 signals a reformer 44, an apparatus that converts natural gas into the hydrogen to increase the hydrogen flow into the fuel cell stack 32. This increase in the hydrogen flow, in turn, increases the heat output of the fuel cell system 30. Similarly, when the heat demand signal indicates a decrease in the heat output, the controller 40 signals the reformer 44 to decrease the hydrogen flow into the fuel cell stack 32, an action that decreases the heat output of the fuel cell system 30.

Figure 3:
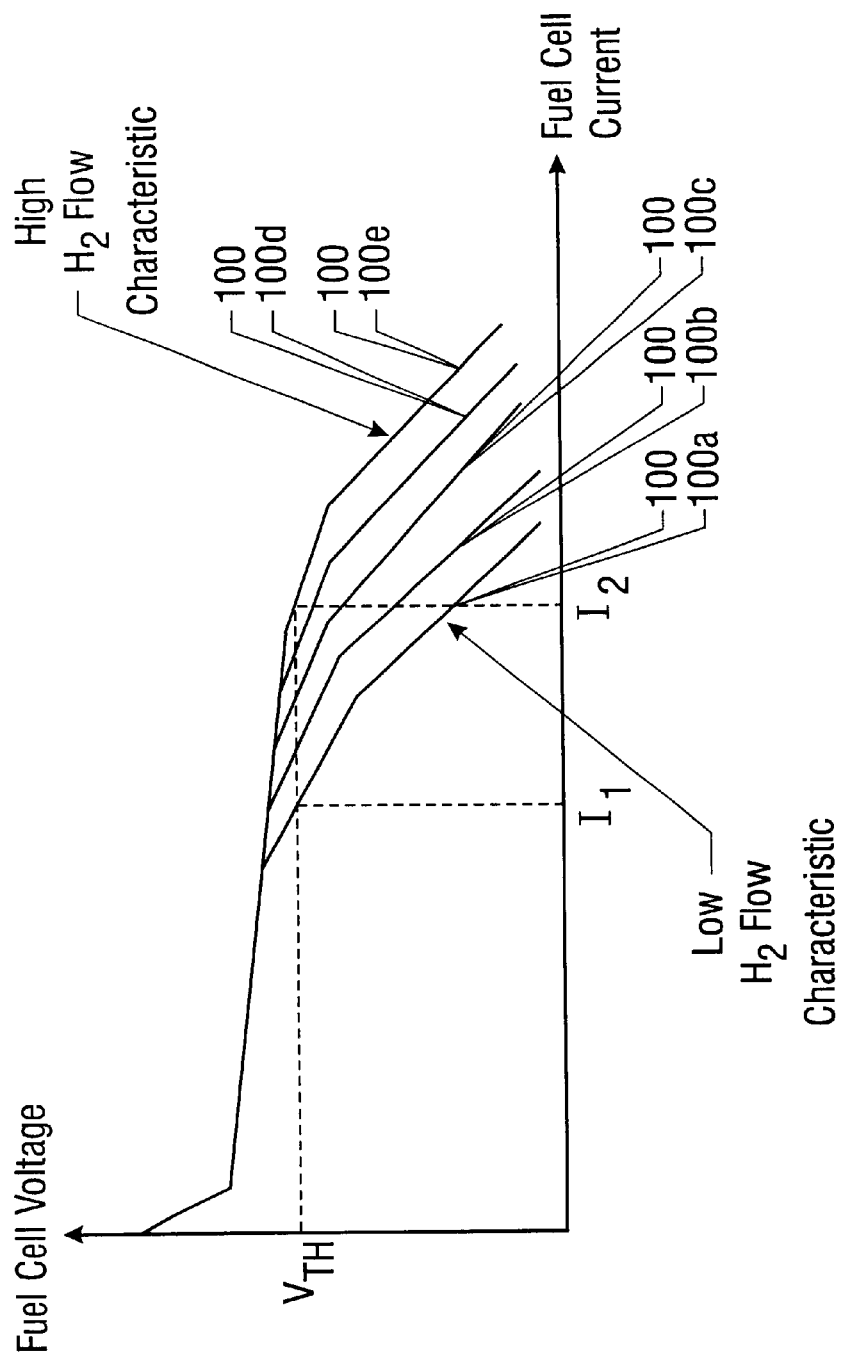
FIG. 3 illustrates polarization curves of fuel cells of the fuel cell system of FIG. 1 according to an embodiment of the invention.

A change in the hydrogen flow to the stack 20 may change the cell voltages of the stack 20. For example, FIG. 3 depicts cell polarization curves 100 (polarization curves 100a, 100b, 100c, 100d and 100e, as examples) for different hydrogen flows. Each polarization curve 100 depicts a cell voltage versus its current. As shown each polarization curve 100 has generally three regions. In the lowest current region, the cell voltage has a large negative slope versus the cell current. As the current increases, the polarization curve 100 enters the second region in which the cell voltage is less sensitive to the cell's current. However, eventually, the polarization curve 100 enters the third region in which the cell voltage has a large negative slope versus cell current. The voltage of the minimum voltage cell may be within this third region, and as a result, the voltage may vary substantially due to an increase or decrease in the hydrogen flow.

As depicted by the polarization curves 100, the range of current (and thus, the range of power output of the cell) at which a particular cell operates may be extended by increasing the hydrogen flow. For example, a particular hydrogen flow may cause a particular cell to have the polarization curve 100a, and the threshold minimum cell voltage (called $V_{TH}$ in FIG. 3) may permit the cell to produce a maximum current of $I_1$. However, the hydrogen flow may be increased to cause the cell to have a polarization curve 100e, a curve that permits the cell to furnish a larger current ($I_2$) at the $V_{TH}$ voltage. Therefore, for a particular cell, the hydrogen flow may be increased to increase the power output (and current) of the cell and decreased to decrease the power output (and current) of the cell.

Referring back to FIG. 1, among the other features of the fuel cell system 30, an inverter 34 is coupled to the fuel cell output terminals of the fuel cell stack 32. The inverter 34 converts the DC power that is provided by the fuel cell stack 32 into AC power that is furnished to the power grid 35. The controller 40 may interact with the inverter 34 via one or more control lines 54 to control the power that the inverter 34 provides to the power grid 35. For example, the controller 40 may control an output voltage (of the inverter 34) that is furnished to the power grid 35. The controller 40 may use a current sensor 31 to monitor an output current of the stack 32. An oxidizer 38 of the fuel cell system 30 may receive unconsumed hydrogen from the fuel cell stack 32 and furnish the unconsumed hydrogen to an oxidizer 38 that oxidizes the hydrogen to produce additional heat.

The fuel cell system 30 may also include a control valve 42 that has an input conduit 48 for receiving an air flow for supplying oxygen to the fuel cell stack 32 and an input conduit 50 for receiving a hydrogen flow from the reformer 44. The control valve 42 supply the hydrogen and oxygen flow to outlet conduits 47 and 49 that deliver these reactants to the appropriate reactant manifold passageways of the fuel cell stack 32.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:

regulating a fuel cell system to produce an amount of heat, the fuel cell system producing electrical energy;

scanning at least one cell voltage of the fuel cell system;

transferring the electrical energy from the fuel cell system to a power grid; and regulating a rate of the transfer based on the at least one cell voltage.

2. The method of claim 1, wherein the scanning comprises:

continually monitoring the cell voltages during the regulation to determine the lowest voltage of the cell voltage.

3. The method of claim 1, wherein said at least one cell voltage may be associated with different fuel cells of the fuel system during the regulation.

4. The method of claim 1, wherein the regulating comprises:

controlling an output voltage based on said at least one voltage.

5. The method of claim 1, wherein the regulating comprises:

preventing the cell voltages from decreasing below a threshold voltage.

6. The method of claim 1, wherein the regulating comprises preventing said at least one voltage from decreasing below a threshold voltage.

7. A fuel cell system comprising:

a fuel cell stack adapted to produce heat in response to a fuel flow;

a power conditioning unit coupled to the fuel cell stack and adapted to use electrical energy produced by the fuel cell stack to furnish electrical power that is received by a power grid; and a circuit adapted to:
 interact with the fuel cell system to produce an amount of heat,
 determine at least one cell voltage of a fuel cell of the fuel cell stack,
 interact with the power conditioning unit to regulate the amount of the electrical power being furnished by the power conditioning unit based on the voltage of the at least one cell.

8. The fuel cell system of claim 7, wherein the circuit comprises:
 a voltage monitoring circuit to scan the cell voltages.

9. The fuel cell system of claim 7, wherein the voltage monitoring circuit continually scans the cell voltages.

10. The fuel cell system of claim 7, wherein the circuit comprises:
 a controller adapted to receive a signal indicative of the heat.

11. The fuel cell system of claim 7, wherein the said at least one voltage may be associated with different fuel cells of the fuel cell stack during the regulation by the circuit.

12. The fuel cell system of claim 7, wherein the circuit interacts with the power conditioning unit to regulate the transfer of power by regulating an output voltage of the power conditioning unit.

13. The fuel cell system of claim 7, wherein the circuit is adapted to prevent cell voltages of the stack from decreasing below a threshold voltage.

14. The fuel cell system of claim 7, wherein the circuit is adapted to prevent said at least one voltage from decreasing below a threshold voltage.

15. A fuel cell system comprising:
 a fuel cell stack adapted to produce power and heat in response to a fuel flow; and
 an apparatus adapted to regulate the fuel flow to control the amount of heat produced by the fuel cell stack based on the lowest cell voltage of the fuel cell stack.

16. The fuel cell system of claim 15, wherein the apparatus is adapted to scan cells of the fuel cell stack to locate the cell having said lowest cell voltage.

17. The fuel cell system of claim 15, wherein the apparatus comprises:
 a voltage monitoring circuit to scan voltages of cells of the fuel cell stack.

18. The fuel cell system of claim 17, wherein the voltage monitoring circuit is adapted to continually scan the voltages of the cells.

19. The fuel cell system of claim 15, wherein the apparatus comprises:
 a controller adapted to receive a signal indicative of a heat.

20. The fuel cell system of claim 15, wherein the apparatus is adapted to prevent the voltages of cells of the stack from decreasing below a threshold voltage.

21. A method comprising:
 regulating a fuel cell system to produce an amount of heat, the fuel cell system producing electrical energy;
 scanning at least one cell voltage of the fuel cell system;
 comparing the at least one cell voltage to a threshold voltage; and
 transferring the electrical energy from the fuel cell system to a power grid when the at least one cell voltage is greater than the threshold voltage.

\* \* \* \* \*